US009703061B1

(12) United States Patent
Fernandez et al.

(10) Patent No.: US 9,703,061 B1
(45) Date of Patent: Jul. 11, 2017

(54) SWITCH OR ROUTER OPTIC REPLACEMENT DEVICE (71) Applicant: Amazon Technologies, Inc., Seattle, WA (US)

(72) Inventors: David Fernandez Fernandez, Dublin (IE); Tomas Martin Ainsworth, Dublin (IE)

(73) Assignee: Amazon Technologies, Inc., Seattle, WA (US)

(*) Notice: Subject to any disclaimer, the term of this patent is extended or adjusted under 35 U.S.C. 154(b) by 211 days.

(21) Appl. No.: 14/751,034

(22) Filed: Jun. 25, 2015

(51) Int. Cl.
G02B 6/00 (2006.01)
F16L 3/22 (2006.01)
F16L 3/08 (2006.01)
G02B 6/44 (2006.01)
H04Q 11/00 (2006.01)
F16L 3/227 (2006.01)
F16M 13/02 (2006.01)
H02G 3/04 (2006.01)

(52) U.S. Cl.
CPC ............ *G02B 6/4452* (2013.01); *F16L 3/227* (2013.01); *F16M 13/022* (2013.01); *H02G 3/0456* (2013.01); *H04Q 11/0066* (2013.01); *H04Q 2011/0081* (2013.01)

(58) Field of Classification Search
CPC ..... G02B 6/4439; G02B 6/4452; F16L 3/227; H04Q 11/0066; H04Q 1/09; H02G 3/0456

USPC ............ 385/100, 134–139; 248/49, 68.1, 71, 248/74.4, 239; 174/68.1, 72 A
See application file for complete search history.

(56) References Cited

U.S. PATENT DOCUMENTS 8,093,499 B2 * 1/2012 Hoffer .................. H02G 3/0456
174/68.1
8,391,663 B2 * 3/2013 Carter ...................... H04Q 1/09
385/100

* cited by examiner

*Primary Examiner* — Akm Enayet Ullah
*Assistant Examiner* — Michael Mooney
(74) *Attorney, Agent, or Firm* — Kilpatrick Townsend & Stockton LLP (57) ABSTRACT Methods for transferring input/output cables from a switch or router to a replacement switch or router employ a holding fixture for the cables. A holding fixture having a plurality of receptacles is supported such that the plurality of receptacles is disposed adjacent to the switch or router to be replaced. Each of a plurality of cables is decoupled from the switch or router to be replaced. Each of the cables is coupled with the holding fixture such that each of the cables is supported via a respective one of the plurality of receptacles. The switch or router is replaced with the replacement switch or router. Each of the cables is transferred from the respective receptacle of the holding fixture to a respective one of the ports of the replacement switch or router.

20 Claims, 7 Drawing Sheets

SWITCH OR ROUTER OPTIC REPLACEMENT DEVICE

BACKGROUND

Datacenters are typically configured to support multiple users. Any suitable combination of the users may utilize a datacenter at any particular point in time. To support the wide variety of possible combinations of users, a datacenter will often employ a number of switches and/or routers, which are networking devices that forward data packets. A router is connected to two or more data lines from different networks. A network switch connects data lines from a single network. A data packet is typically forwarded through one or more switches/routers until it reaches its destination.

The switch or routers in a datacenter can malfunction and require replacement. Due to the critical nature of the switches/routers to the datacenter's services, it is desirable to minimize the time it takes to replace a switch or router so as to minimize associated disruption to datacenter users. Unfortunately, a switch or router typically interfaces with many input/output lines (e.g., data lines), thereby complicating the task of replacing a malfunctioning switch or router.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Methods for replacing datacenter switch or routers and related holding fixtures are provided. In many embodiments, replacement of a malfunctioning switch or router with a replacement switch or router includes transferring input/output lines (e.g., data lines, optical data lines, wire lines such as copper wire lines) connected to the malfunctioning switch or router to a holding fixture having receptacles configured to hold the input/output lines. In many embodiments, the holding fixture includes an identification disposed next to each of the receptacles to associate the receptacle with a corresponding one of the ports of the malfunctioning switch or router and a corresponding one of the ports of the replacement switch or router. Once the input/output lines are transferred to the corresponding receptacles in the holding fixture, the malfunctioning switch or router is replaced with the replacement switch or router. With the replacement switch or router in place, the input/output lines are then transferred from the holding fixture and coupled to the corresponding ports in the replacement switch or router. Accordingly, by utilizing the holding fixture, the input/output lines can be transferred from the malfunctioning switch or router to the replacement switch or router in a manner that ensures that each of the input/output lines are coupled with a port of the replacement switch or router corresponding to the port of the malfunctioning switch or router from which the input/output line was decoupled, thereby reducing time and effort necessary to verify correct coupling of the input/output lines with the replacement switch or router. The reduced effort to verify correct coupling of the input/output lines with the replacement switch or router also permits replacement of switch or routers by personnel without extensive training on how to identify data lines.

The methods and holding fixtures are described herein in the context of rack-mounted optical switches/routers. The methods and holding fixtures described herein, however, can be adapted for use in replacement of other datacenter components, such as any suitable component that interfaces with a plurality of input/output lines, including both rack-mounted and non-rack mounted components.

Figure 1:
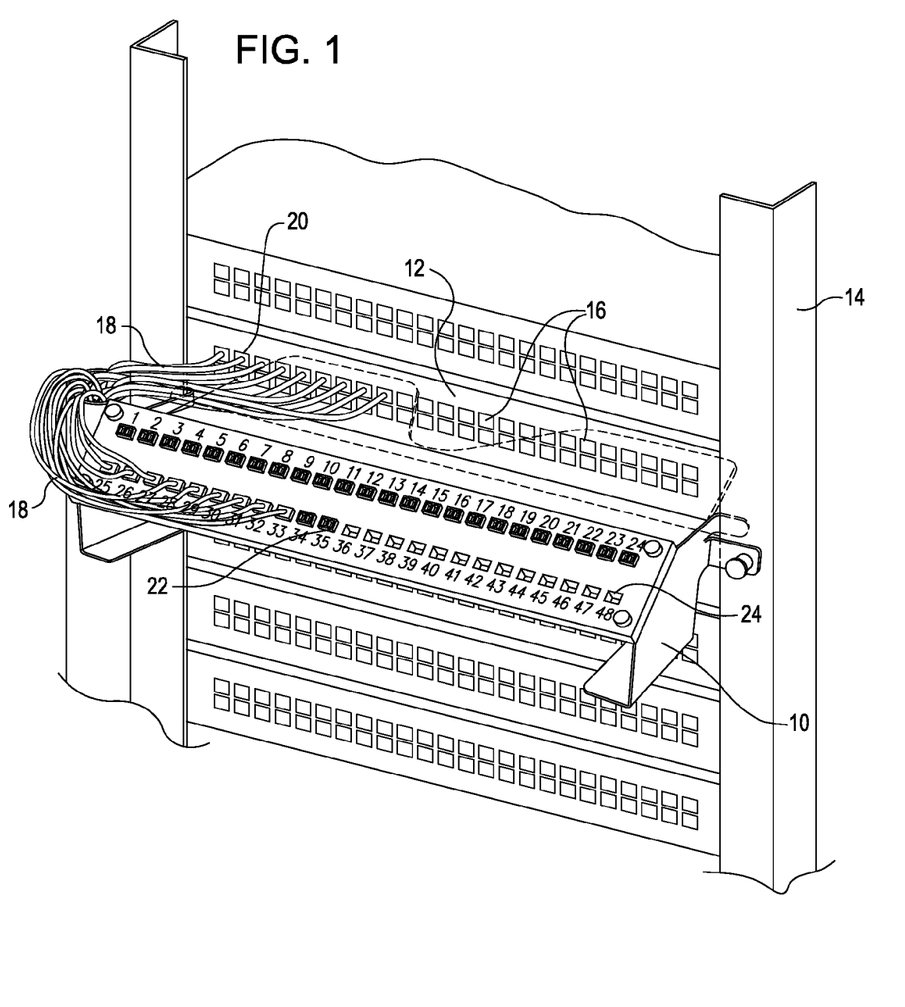
FIG. 1 illustrates the use of a holding fixture during replacement of a switch or router mounted in a component rack, in accordance with many embodiments.

Turning now to the drawings in which like reference numbers indicate like elements in the various figures, FIG. 1 illustrates the use of a holding fixture 10 during replacement of a switch or router 12 mounted in a component rack 14, in accordance with many embodiments. In the illustrated embodiment, the switch or router 12 is an optical switch or router having multiple data ports 16. During normal use, multiple optical data cables 18 are connected to the switch or router 12 via optical connectors 20, which couple each of the optical data cables 18 with a respective one of the data ports 16 in a specified arrangement. The holding fixture 10 can also employed to hold wire lines, such as copper wire lines.

In the illustrated embodiment, each of the data cables 18 is decoupled from its respective optical connectors 20 and then coupled with a respective replacement optical connector 22 held by the holding fixture 10. The holding fixture 10 has a plurality of receptacles 24 configured to hold the replacement optical connectors 22. In the illustrated embodiment, the holding fixture 10 has two rows of 24 receptacles 24, for a total of 48 of the receptacles 24. Any suitable number and arrangement of the receptacles 24 can be used. For example, in the illustrated embodiment, the number and arrangement of the receptacles 24 match the number and arrangement of the data ports 16 of the switch or router 12.

Once each of the data cables 18 has been coupled with a respective one of the replacement optical connectors 22, the switch or router 12 can then be removed from the rack 14 and a replacement switch or router mounted in the rack 14.

Each of the replacement optical connectors 22 is then removed from its receptacle 24 and then coupled with the corresponding data port in the replacement switch or router, thereby coupling each of the optical cables 18 with the correct data port of the replacement switch or router. The holding fixture 10 can then be removed and preloaded with replacement connectors 22 in preparation for future use in replacing another switch or router 12.

Figure 2:
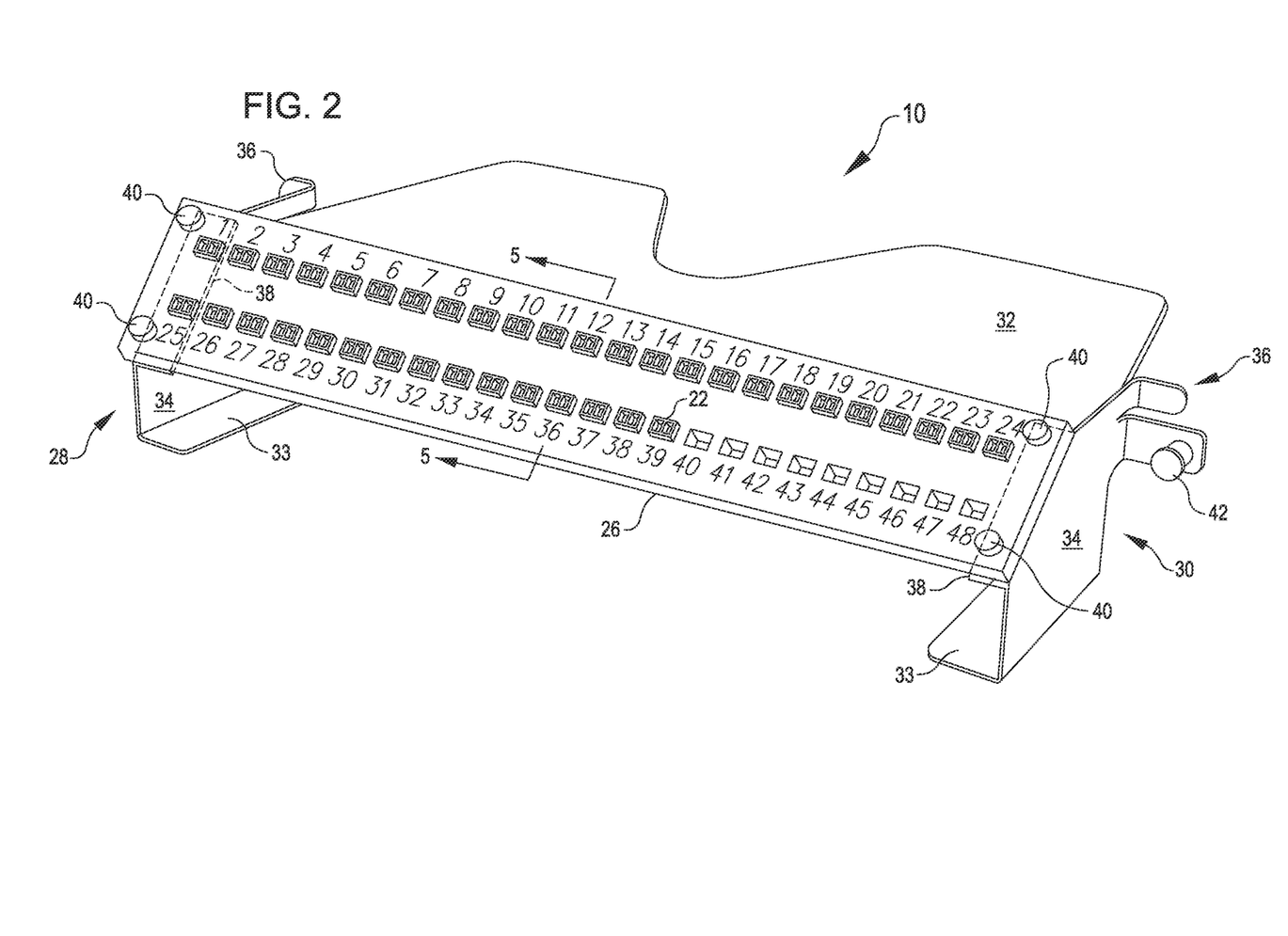
FIG. 2 illustrates the holding fixture of FIG. 1.

FIG. 2 provides a closer view of the holding fixture 10. In the illustrated embodiment, the holding fixture 10 includes an optical cable support member 26, a left end frame 28, a right end frame 30, and an aft protruding flange 32. The optical cable support member 26 is attached to each the left and right frames 28, 30 and thereby supported by the left and right frames 28, 30. In a similar fashion, the aft protruding flange 32 is attached to each of the left and right frames 28, 30 and thereby supported by the left and right frames 28, 30. The aft protruding flange 32 is configured to be inserted between components mounted in the component rack 14 to support the optical cable support member 26 in a suitable position and orientation relative to the component being replaced. Each of the left and right frames 28, 30 includes a lower horizontal flange 33, a vertical web 34, mounting flanges 36, and attachment flanges 38 to which the optical cable support member 26 is secured via fasteners 40. The lower horizontal flanges 33 are coplanar and provide a base for the holding fixture 10 such that the holding fixture 10 is supported in stable fashion when set on a horizontal support surface. In FIG. 2, replacement optical connectors 22 are shown in each of receptacles numbered 1 through 39 with receptacles 40 through 48 shown without replacement optical connectors 22.

Figure 3:
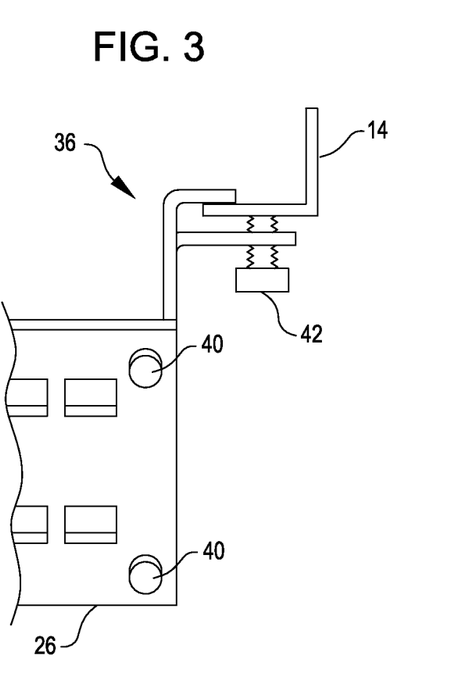
FIG. 3 illustrates a clamping mechanism for mounting a holding fixture to a component rack, in accordance with many embodiments.
Figure 4:
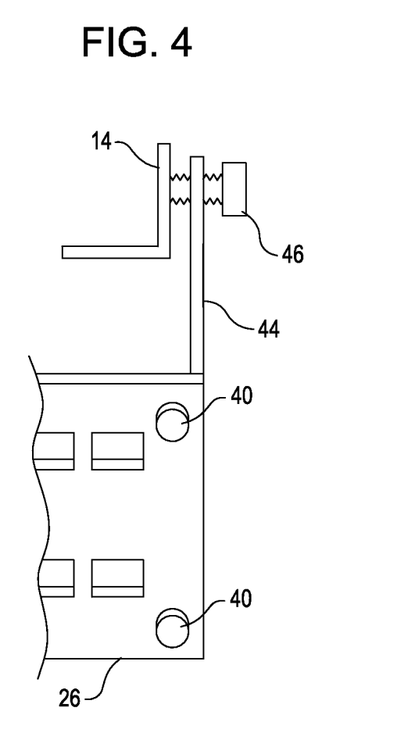
FIG. 4 illustrates a side clamping mechanism for mounting a holding fixture to a component rack, in accordance with many embodiments.

As illustrated in FIG. 3, the mounting flanges 36 are selectively interfaceable with the component rack 14 such that the holding fixture 10 can be mounted to the component rack 14 to support the optical cable support member 26 in a suitable position relative to the switch or router 12 being replaced. In the illustrated embodiment, a threaded fastener 42 is mounted to the lower of the mounting flanges 36 via a threaded hole and is adjustable to enable mounting and demounting of the holding fixture 10 to and from the component rack 14. In an alternate embodiment illustrated in FIG. 4, the holding fixture 10 includes a side mounting flange 44 disposed at each end of the holding fixture 10. The side mounting flanges 44 are spaced apart a suitable amount wider than the width of the component rack 14 to enable positioning of the holding fixture 10 so that the side mounting flanges 44 extend along opposing sides of the component rack 14 to position the one or more threaded clamping fasteners 46 for clamping of the component rack 14 between the side mounting flanges 44 to mount the holding fixture 10 to the component rack 14 in a suitable position relative to the switch or router being replaced.

In particular embodiments, the holding fixture 10 comprises magnets (not shown) fixed to the mounting flanges 36, either in place of or in addition to the threaded fasteners 42. The magnets can help hold the holding fixture against the component rack 14.

In still further embodiments, the optical cable support member 26 is not attached to a frame, but is instead suspended from straps. For example, proximate ends of two straps can be attached to respective, opposing ends of the support member 26, with distal ends of the straps being attachable to the component rack 14 using magnets, clips, or other fasteners. The straps are attached to the rack 14 above the position of the switch or router being replaced.

Figure 5:
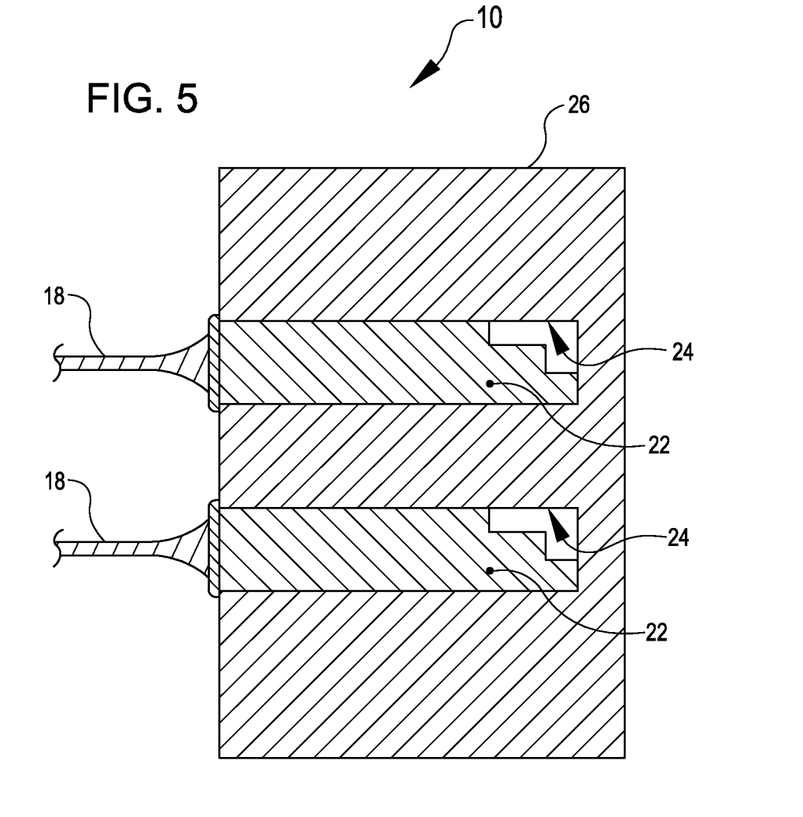
FIG. 5 is a cross-sectional view of a holding device and fiber optic cables and end connectors held by the holding device, in accordance with many embodiments.

FIG. 5 is a cross-sectional view of the holding device 10 showing fiber optic cables 18 and associated replacement optical connectors 22 held by the holding device 10, in accordance with many embodiments. The optical cable support member 26 of the holding fixture 10 includes the receptacles 24, which are configured to accommodate the replacement optical connectors 22. FIG. 5 shows optical data cables 18 coupled with the replacement optical connectors 22 prior to transfer of the replacement optical connectors 22 and associated data cables 18 to the replacement switch or router.

Any suitable holding fixture for holding input/output lines can be used during replacement of any suitable datacenter component. For example, in many embodiments, a holding fixture for optical cables during replacement of an optical switch or router includes an optical cable support member and one or more frame members attached to the optical cable support member. The optical cable support member has a plurality of receptacles. Each of the plurality of receptacles is configured to hold an end portion of one of a plurality of optical cables coupled with a first optical switch or router during replacement of the first optical switch or router with a second optical switch or router. The one or more frame members are configured to attach to one or more optical switch or routers and/or a component rack in which the one or more optical switch or routers are mounted to support the optical cable support member to position each of the plurality of receptacles to hold an end portion of a respective one of the plurality of optical cables during the replacement of the first optical switch or router with the second optical switch or router.

In many embodiments, the optical cable support member has a unique identification reference symbol disposed adjacent to each of the plurality of receptacles. Each of the holding fixture identification numbers can match an identification number of a respective one of the optical ports in each of the first optical switch or router and the second optical switch or router.

Any suitable number and arrangement of the receptacles in the optical cable support member can be used. For example, in many embodiments, the plurality of receptacles in the optical cable support member include 48 receptacles arranged in two rows of 24 receptacles.

In many embodiments, the holding fixture includes features used to support the optical cable support member in a suitable position and orientation relative to the switch or router being replaced. For example, the one or more frame members can include a protruding flange configured to be inserted between optical switch or routers mounted in the component rack. The holding fixture can include one or more clamp mechanisms coupled with the one or more frame members and operable to clamp the one or more frame members to the component rack and/or one or more optical switch or routers mounted in the component rack. The one or more frame members can include opposing end flanges spaced apart to be positionable along opposing side surfaces of the component rack. The one or more clamp mechanisms can be supported by a respective one or more of the opposing end flanges and operable to clamp the component rack between the one or more opposing end flanges to mount the holding fixture to the component rack.

The receptacles in the optical cable support member can have any suitable configuration. For example, each of the plurality of receptacles in the optical cable support member can be configured to hold a replacement optical connector. As another example, each of the plurality of receptacles can be configured to hold the end of an optical cable.

The holding fixture can be preloaded with replacement optical connectors. Each of the replacement connectors can be mounted in a respective one of the plurality of receptacles in the optical cable support member.

Figure 6:
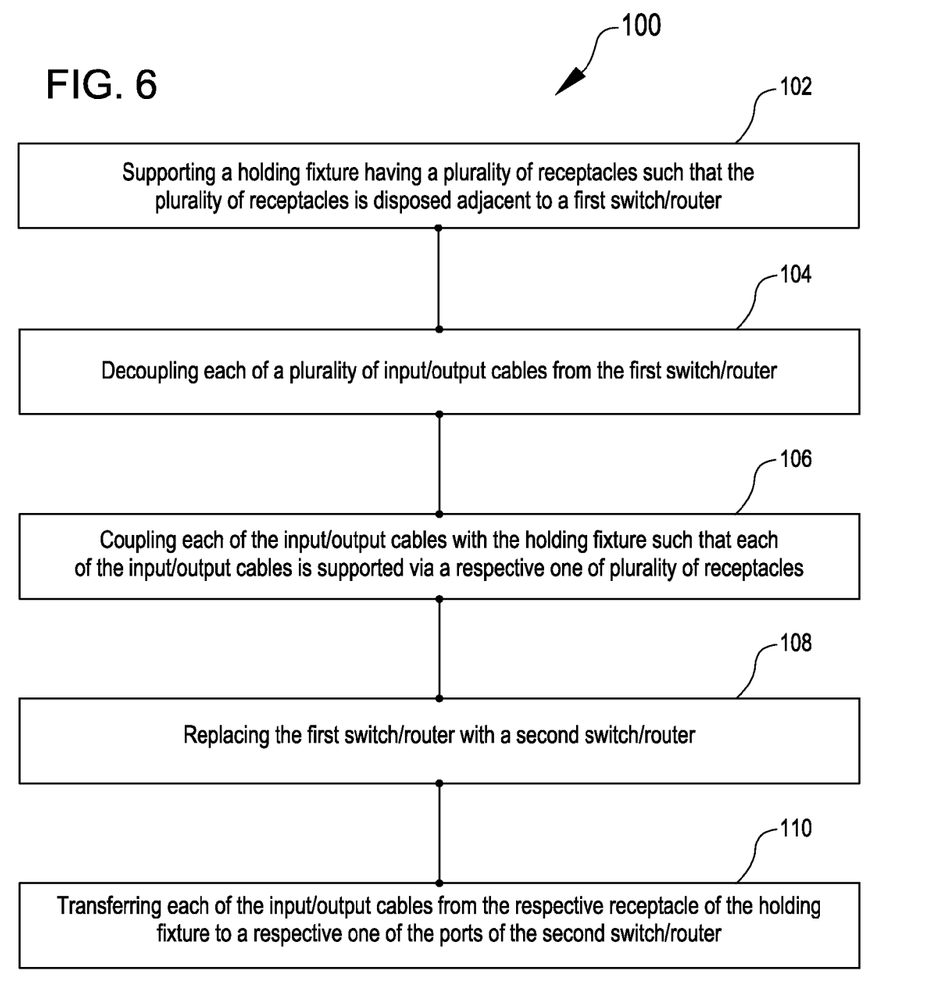
FIG. 6 is a simplified block diagram of acts of a process for replacing a switch or router, in accordance with many embodiments.

FIG. 6 is a simplified block diagram of acts of a process 100 for replacing a first switch or router with a second switch or router, in accordance with many embodiments. Any suitable holding fixture can be used to practice the process 100, such as the holding fixtures described herein.

In act 102, a holding fixture having a plurality of receptacles is supported such that the plurality of receptacles is disposed adjacent to the first switch or router. Any suitable approach can be used to support the holding fixture relative to the first switch or router. For example, the holding fixture can be mounted to a component rack in which the first switch or router is mounted and/or to one or more switch or routers mounted in the component rack using any suitable approach including those described herein.

With the holding fixture supported adjacent to the first switch or router, input/output cables coupled to the first switch or router are transferred to the holding fixture. In act 104, each of a plurality of input/output cables are decoupled from the first switch or router. In act 106, each of the input/output cables is coupled with the holding fixture such that each of the cables is supported via a respective one of the plurality of receptacles. In many embodiments, the input/output cables are sequentially transferred by decoupling the input/output cable from the first switch or router and coupling the input/output cable to the holding fixture prior to decoupling the next input/output cable from the first switch or router. The first switch or router can be replaced by the second switch or router (act 108) when all the input/output cables have been transferred from the first switch or router to the holding fixture. With the second switch or router in place, each of the input/output cables is then transferred from the respective receptacle of the holding fixture to a respective one of the ports of the second switch or router (act 110).

Figure 7:
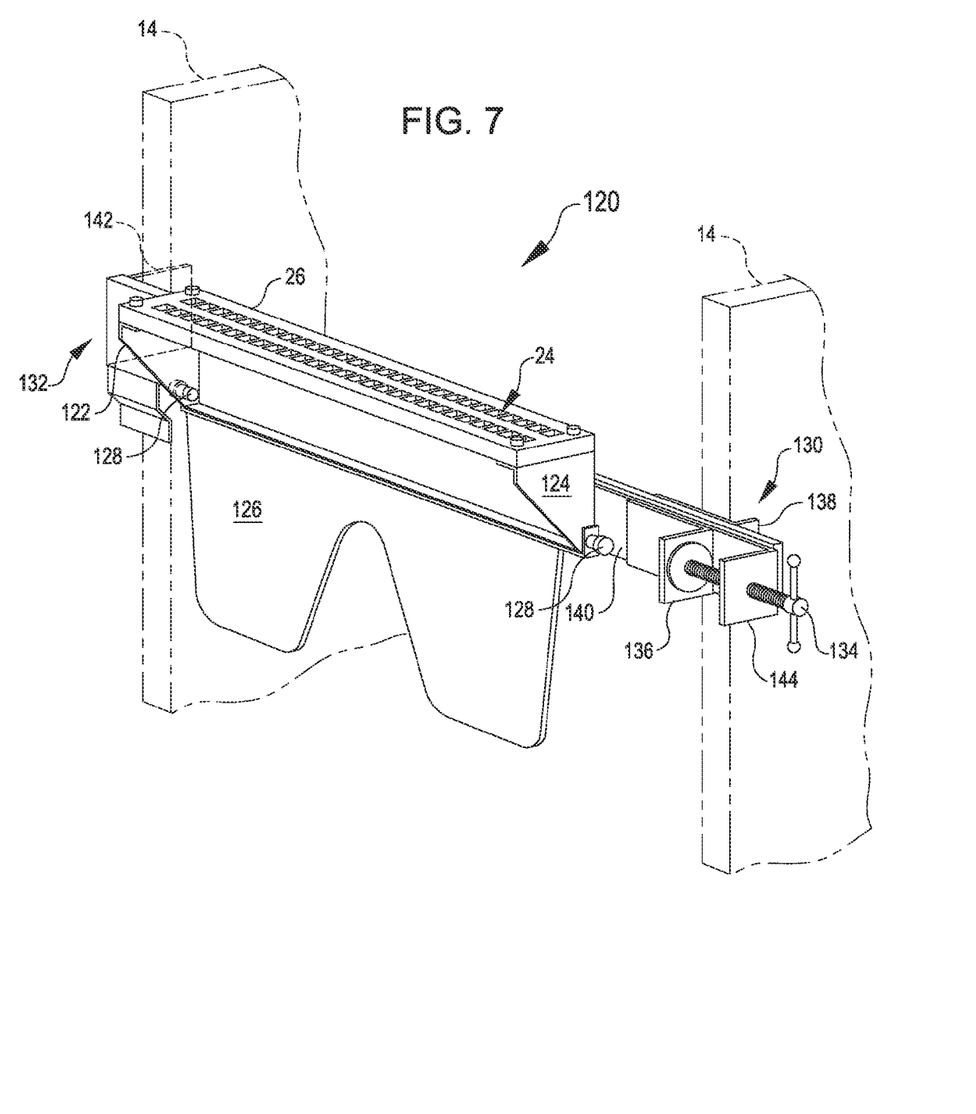
FIG. 7 illustrates a holding fixture mounted to a component rack via a clamp assembly such that receptacles for holding ends of input/output lines are oriented vertically, in accordance with many embodiments.

FIG. 7 illustrates a holding fixture 120, in accordance with many embodiments. The holding fixture 120 is configured similar to the holding fixture 10. For example, the holding fixture 120 includes an optical cable support member 26, a left end frame 122, a right end frame 124, and a repositionable protruding flange 126. The optical cable support member 26 is attached to each of the left and right frames 122, 124 and thereby supported by the left and right frames 122, 124. The repositionable protruding flange 126 is detachably mountable to the left and right frames 122, 124 via fasteners 128. Any suitable fastener 128 can be used. For example, in the illustrated embodiment, the fasteners 128 include spring-loaded pull pins that are received in respective holes in the left and right frames 122, 124. In FIG. 7, the repositionable protruding flange 126 is shown coupled to the left and right frames 122, 124 in a storage configuration in which the flange 126 hangs vertically below the left and right frames 122, 124.

In FIG. 7, the holding fixture 120 is mounted to a clamp assembly 130 configured for mounting of the holding fixture 120 to the component rack 14 so that the receptacles 24 are oriented vertically. The clamp assembly 130 includes a cross member 132, a clamping screw assembly 134, and clamping flanges 136, 138. The cross member 132 includes a cross beam 140, a left end flange 142, and a right end flange 144. The right end flange 144 has a threaded hole through which the clamping screw assembly 134 is threaded. The left end flange 142 interfaces with a left side surface of the component rack 14 when the clamp assembly 130 is clamped to the component rack 14. The clamping flange 138 interfaces with a right side surface of the component rack 14 when the clamp assembly 130 is clamped to the component rack 14. The clamping flange 136 is coupled to the clamping flange 138 via fasteners extending through slotted holes in the cross beam 140 so as to allow repositioning of the clamping flanges 136, 138 along the cross beam 140. The clamping screw assembly 134 interfaces with the clamping flange 136. Selective adjustment of the clamping screw assembly 134 can be used to push the clamping flange 136 towards the left end flange 142, thereby simultaneously pushing the clamping flange 138 towards the left end flange 142 to clamp the clamp assembly 130 to the component rack 14 thereby supporting the holding fixture 120 in a suitable position and orientation for use during replacement of a switch or router mounted in the component rack 14.

Figure 8:
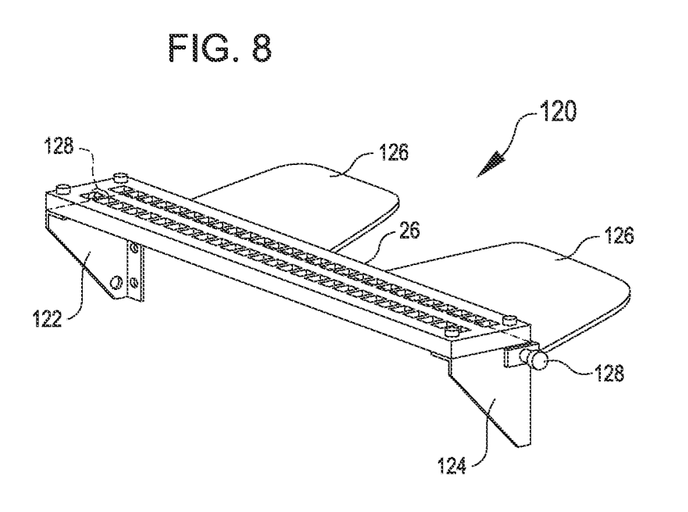
FIG. 8 illustrates the holding fixture of FIG. 7 with a repositionable protruding flange in a use configuration in which the flange extends horizontally for insertion between components mounted in a component rack.

In FIG. 8, the repositionable protruding flange 126 is shown coupled to the left and right frames 122, 124 in a use configuration in which the flange 126 extends horizontally. In the illustrated use configuration, the repositionable protruding flange 126 is coupled with the left and right frames 122, 124 via engagement of the fasteners 128 with a different set of holes in the left and right frames 122, 124 relative to the storage configuration shown in FIG. 7 thereby positioning the flange 126 closer to the optical cable support member 26. In the use configuration shown in FIG. 8, the aft protruding flange 126 is configured to be inserted between components mounted in the component rack 14 to support the optical cable support member 26 in a suitable position and horizontal orientation relative to the component being replaced. In the use configuration shown in FIG. 8, the holding fixture 120 can be used with or without the clamp assembly 130 to mount the holding fixture 120 to the component rack 14 and/or to components mounted in the component rack 14 to support the optical cable support member 26 in a suitable position and orientation for use during replacement of a component mounted in the component rack 14.

Techniques described herein include can be used to speed the replacement of any suitable electronic component having a plurality of input/output lines coupled thereto. While embodiments are described herein with reference to optical switch or routers, the holding fixtures and/or processes described herein can be applied to any suitable electronic component having a sufficient number of input/output lines coupled thereto to benefit from the use of a holding fixture to transfer lines from the component being replaced to the replacement component.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of replacing a first optical switch or router with a second optical switch or router, the first optical switch or router having a first plurality of optical ports, the second optical switch or router having a second plurality of optical ports, the method comprising:
   supporting the first optical switch or router in a component rack, each of a plurality of optical cables being optically coupled with the first optical switch or router via a respective one of the plurality of optical ports;
   coupling a holding fixture to the component rack, the holding fixture having a plurality of receptacles such that the plurality of receptacles are disposed adjacent to the first optical switch or router supported in the component rack;
   decoupling each of the optical cables from the first optical switch or router supported in the component rack;
   coupling each of the optical cables with the holding fixture such that each of the optical cables is supported via a respective one of the plurality of receptacles;
   removing the first optical switch or router from the component rack;
   mounting the second optical switch or router in the component rack; and
   transferring each of the optical cables from the respective receptacle of the holding fixture to a respective one of the optical ports of the second optical switch or router.

2. The method of claim 1, wherein the holding fixture has a unique identification number adjacent to each of the plurality of receptacles of the holding fixture, each of the holding fixture identification numbers matching an identification number of a respective one of the optical ports in each of the first optical switch or router and the second optical switch or router.

3. The method of claim 1, wherein the holding fixture comprises magnets, the magnets being coupled to the component rack.

4. The method of claim 1, wherein coupling the holding fixture to the component rack comprises clamping or fastening the holding fixture to the component rack or to one or more components mounted in the component rack.

5. The method of claim 1, wherein:
   each of the optical cables, when coupled with the first optical switch or router, is optically coupled with the respective optical port of the first optical switch or router via a respective optical connector;
   each of a plurality of replacement optical connectors is disposed in a respective one of the plurality of receptacles of the holding fixture;
   decoupling each of the optical cables from the first optical switch or router supported in the component rack comprises decoupling the optical cable from the respective optical connector used to couple the optical cable with the respective optical port of the first optical switch or router;
   coupling each of the optical cables with the holding fixture such that each of the optical cables is supported via a respective one of the plurality of receptacles comprises coupling the optical cable with one of the replacement optical connectors disposed in the respective one of the plurality of receptacles of the holding fixture; and
   transferring each of the optical cables from the respective receptacle of the holding fixture to a respective one of the optical ports of the second optical switch or router comprises transferring each of the replacement optical connectors from the respective receptacle into the respective one of the optical ports of the second optical switch or router.

6. The method of claim 1, wherein the plurality of receptacles in the holding fixture includes one or more rows of 24 receptacles in each row.

7. The method of claim 1, wherein the optical cables are sequentially transferred from the first optical switch or router to the holding fixture such that each of the optical cables, when decoupled from the first optical switch or router, is transferred to the holding fixture prior to decoupling of the next in the sequence of the optical cables from the first optical switch or router.

8. A holding fixture for network cables during replacement of a switch or router, the holding fixture comprising:

a cable support member having a plurality of receptacles, each of the plurality of receptacles being configured to hold an end portion of one of a plurality of cables coupled with a first optical switch or router during replacement of the first switch or router with a second switch or router; and a frame member attached to the cable support member, the frame member being configured to attach to one or more switch or routers or to a component rack in which the one or more switch or routers are mounted, the frame member being configured to support the cable support member to position the receptacles to each hold an end portion of a respective one of the plurality of cables during the replacement of the first switch or router with the second switch or router.

9. The holding fixture of claim 8, wherein the cable support member has a unique identification reference symbol disposed adjacent to each of the plurality of receptacles.

10. The holding fixture of claim 9, wherein each of the holding fixture identification numbers matches an identification number of a respective one of the ports in each of the first switch or router and the second switch or router.

11. The holding fixture of claim 8, wherein the plurality of receptacles in the cable support member includes one or more rows of 24 receptacles in each row.

12. The holding fixture of claim 8, wherein the frame member includes a protruding flange configured to be inserted between components mounted in the component rack.

13. The holding fixture of claim 8, wherein each of the plurality of receptacles in the cable support member is configured to hold a replacement connector.

14. The holding fixture of claim 13, wherein each of the plurality of receptacles is configured to hold the replacement connector in a vertical orientation.

15. The holding fixture of claim 8, further comprising one or more clamp mechanisms coupled with the frame member and operable to clamp the frame member to the component rack or one or more components mounted in the component rack.

16. The holding fixture of claim 15, wherein:
the frame member includes opposing end flanges spaced apart to be positionable along opposing side surfaces of the component rack; and
the one or more clamp mechanisms is supported by a respective one or more of the opposing end flanges and operable to clamp the component rack between the one or more opposing end flanges to mount the holding fixture to the component rack.

17. A method of replacing a first switch or router with a second switch or router, the first switch or router having a first plurality of ports, the second switch or router having a second plurality of ports, the method comprising:
supporting a holding fixture having a plurality of receptacles such that the plurality of receptacles is disposed adjacent to the first switch or router;
decoupling each of a plurality of cables from the first switch or router;
placing each of the cables into a respective one of the plurality of receptacles;
replacing the first switch or router with a second switch or router; and
transferring each of the cables from the holding fixture to a respective one of the ports of the second switch or router.

18. The method of claim 17, wherein replacing the first switch or router with the second switch or router comprises removing the first switch or router from a component rack and mounting the second switch or router in the component rack.

19. The method of claim 17, wherein:
the cables are sequentially transferred from the first switch or router to the holding fixture; and
the cables are sequentially transferred from the holding fixture to the second switch or router.

20. The method of claim 17, wherein the holding fixture has a unique identification reference disposed adjacent to each of the plurality of receptacles corresponding to the ports in each of the first and second switch or routers.

* * * * *